(12) United States Patent
Maunsell et al.

(10) Patent No.: US 7,988,790 B2
(45) Date of Patent: Aug. 2, 2011

(54) WASHING APPLIANCE WATER SOFTENER

(75) Inventors: Stephen Robert Maunsell, Dunedin (NZ); Daniel Warwick Blair, London (GB)

(73) Assignee: Fisher & Paykel Appliances Limited, Auckland (NZ)

( * ) Notice: Subject to any disclaimer, the term of this patent is extended or adjusted under 35 U.S.C. 154(b) by 1373 days.

(21) Appl. No.: 10/510,936

(22) PCT Filed: Apr. 10, 2003

(86) PCT No.: PCT/NZ03/00064
§ 371 (c)(1),
(2), (4) Date: May 23, 2005

(87) PCT Pub. No.: WO03/087460
PCT Pub. Date: Oct. 23, 2003

(65) Prior Publication Data
US 2005/0224100 A1  Oct. 13, 2005

(30) Foreign Application Priority Data

Apr. 10, 2002  (NZ) ........................................ 518288

(51) Int. Cl.
*B08B 3/00* (2006.01)
(52) U.S. Cl. .................. 134/56 D; 134/57 D; 134/58 D
(58) Field of Classification Search ................ 134/56 D, 134/57 D, 58 D
See application file for complete search history.

(56) References Cited

U.S. PATENT DOCUMENTS

| 3,807,425 | A | * | 4/1974 | Boirum et al. ................ 137/110 |
| 4,780,247 | A | | 10/1988 | Yasuda |
| 6,189,551 | B1 | | 2/2001 | Sargeant et al. |
| 2002/0017495 | A1 | * | 2/2002 | Iizuka et al. .................. 210/739 |
| 2002/0149489 | A1 | | 10/2002 | Bearak |

FOREIGN PATENT DOCUMENTS

| DE | 2911366 | 2/1980 |
| DE | 2851541 | 6/1980 |
| DE | 3209501 | 10/1983 |
| DE | 3544580 | 6/1987 |
| DE | 4135820 | 5/1996 |
| DE | 199 60 307 | 6/2001 |
| EP | 219704 | 4/1987 |
| EP | 351564 | 1/1990 |
| EP | 367062 | 5/1990 |
| EP | 433676 | 6/1991 |
| EP | 517205 | 12/1992 |
| EP | 545127 | 6/1993 |

(Continued)

*Primary Examiner* — Michael Barr
*Assistant Examiner* — Jason Heckert
(74) *Attorney, Agent, or Firm* — Clark Hill PLC

(57) ABSTRACT

A water softener particularly for use in a dishwasher. The water softener is located in the dishwasher water supply (238) between the primary supply valve and the wash chamber. The softener includes a resin container (207) with an ion exchange resin (290). Water supplied to the wash chamber optionally passes through the resin container (207). Regenerating brine is developed in a brine container (203). The brine container (203) is supplied manually with solid salt (270) and water diverted into the container from the main supply at an air break (201). In the regenerating cycle brine is delivered from the brine container (203) to the resin container (207) by a pump (206). The duty cycle of the pump (206) determines the degree of regeneration of the resin (290).

12 Claims, 7 Drawing Sheets

FOREIGN PATENT DOCUMENTS

| | | |
|---|---|---|
| EP | 741991 | 11/1996 |
| EP | 855164 | 1/1998 |
| EP | 860140 | 9/1998 |
| EP | 900765 | 3/1999 |
| EP | 919178 | 6/1999 |
| EP | 1048776 | 11/2000 |
| FR | 2580165 | 10/1986 |
| FR | 2615617 | 5/1987 |
| FR | 2825176 | 11/2002 |
| GB | 1 158 007 | 7/1969 |
| GB | 1 160 928 | 8/1969 |
| IT | EP 0545127 * | 11/1992 |
| IT | EP 0741991 * | 11/1996 |
| JP | 62-34599 | 2/1987 |
| JP | 63-141427 | 9/1988 |
| JP | 2-134682 | 5/1990 |
| JP | 7-275569 | 10/1995 |
| JP | 9005021 | 1/1997 |
| JP | 11-151397 | 6/1999 |
| JP | 2002-28647 | 1/2002 |
| WO | 98/33462 | 8/1998 |
| WO | 01/10284 | 2/2001 |
| WO | WO 01/26532 * | 4/2001 |

* cited by examiner

WASHING APPLIANCE WATER SOFTENER

TECHNICAL FIELD

The present invention relates to a water softener for an automatic washing machine and in particular but not solely to a dishwasher, which includes means for periodically regenerating the water softener.

BACKGROUND ART

It is well known that soft water is more effective than hard water in washing clothes, dishes or other articles. To solve the problem of hard water, small water softeners associated with either a washing machine or a dishwasher have been used to soften the water entering the machine In water softeners a decalcifier which may comprise a resin container exchanges both the calcium ions ($Ca^{2+}$) and magnesium ions ($Mg^{2+}$) contained in the water with sodium ions ($Na^+$) contained in appropriate resins placed in the resin container. The resins are tiny beads, generally of an inert polymer structure.

Resins or other similar substances become exhausted after a certain usage time. Their ions $Na^+$ to be exchanged with $Ca^{2+}$ and $Mg^{2+}$ contained in the water are consumed; as a result, water will still flow through the resin container but the hardness of the water is not reduced. This drawback is prevented through a resin regeneration cycle. A brine solution (NaCl) is introduced with the aim of regenerating the resin.

To adjust for different levels of water hardness EP219704 Milocco et al and EP433676 Bongini describe means for adjusting the mean path flow of the water through the resin container to adjust the level of water softening. Such arrangements are not easy to use and difficult to manufacture.

A difficulty as to when to replenish salt is addressed by EP0351564 Jerg et al using a mechanical float to indicate the presence or absence of salt. Mechanical float devices can stick and can give a wrong indication resulting in the presence of salt being indicated when there is a lack of salt and the water entering the washing appliance is consequently not soft enough.

Water softeners aim to keep the softness of water within desired bounds, in order to achieve this desire the resins in the resin container need to be kept charged with sodium ions ($Na^+$). EP900765 Zucholl uses electrical conductivity sensors to detect the need to regenerate the resins. EP919178 Carli and EP1048776 Carli also use sensors to detect the degree of exhaustion of the resins. Such sensors include the physical volume of the resins, the pressure exerted by the resins on a switch and the movement of an element contained within the resin container. Such devices add complexity to manufacturing water softeners.

Controlling the volume of brine flushed through the resin container can also control the water softness. EP0367062 Fontana; EP545127 Milocco and EP0860140 Carli use water chambers to regulate the amount of brine flushed through the resins. The use of multiple water chambers adds to the difficulty of manufacturing such water softeners and adjusting such devices.

DISCLOSURE OF THE INVENTION

It is an object of the present invention to provide a water softener for an appliance which at least goes some way towards overcoming the above disadvantages or at least provides the public with a useful choice.

In a first aspect the invention consists a washing appliance, which in use is connected to a water supply, said appliance including a wash chamber, a water softener and a programmed controller, said water softener comprising:

a resin container which contains a resin suitable for softening water which receives water from said water supply and supplies water to said wash chamber;

a brine container having an inlet for the supply of salt, an inlet for the supply of water and an outlet;

a pump controlled by said programmed controller which receives brine from said outlet of said brine container and pumps brine through said resin container to thereby regenerate said resins in accordance, with a duty cycle selected in accordance with the supply water hardness.

In a second aspect the invention consists in a water softener comprising:

a resin container which contains a resin suitable for softening water which receives water from a water supply;

a brine container having an inlet for the supply of salt, an inlet for the supply of water and an outlet;

a pump controlled by a programmed controller which receives brine from said outlet of said brine container and pumps brine through said resin container to thereby regenerate said resins in accordance with a duty cycle selected in accordance with the supply water hardness; and an outlet for the supply of softened water;

In a third aspect the invention consists in a washing appliance which in use is accommodated within a cavity in kitchen joinery or in a free-standing cabinet, said appliance comprising:

a wash system slidably mounted within said cavity in a manner that it may be withdrawn horizontally for access thereto, said wash system including:

an open top chamber adapted to accommodate items to be washed and within which water is circulated;

means to supply water to said open top chamber including water softener means associated with said open top chamber;

means for evacuating wash liquid from said chamber; and a wash chamber closure that covers the open top of said open top chamber on retraction of wash chamber into said cavity.

In a fourth aspect the invention consists in. a salt absence indicator for a brine container of a water softener, said salt absence indicator comprising:

a light source and light sensor located in a spaced apart relationship at the bottom of said brine container, to define an optical path there between, a controller receiving as an input the output signal of said light sensor, and an indicator light said indicator light being energised by said controller upon receiving a signal from said light sensor when the optical path between the light source and light sensor is substantially transmissive.

In a fifth aspect the invention consists in a salt absence detection indicator for a brine container of a water softener, said indicator comprising:

a light pipe extending between said brine container and a point of visibility; and a light located in the bottom of said brine container in alignment with the bottom of said light pipe, wherein rays from said light pass through said light pipe when salt is absent from the space between the light and the end of the light pipe

BRIEF DESCRIPTION OF DRAWINGS

Preferred embodiments of the invention will now be described with reference to the accompanying drawings in which.

MODES FOR CARRYING OUT THE INVENTION

Figure 1:
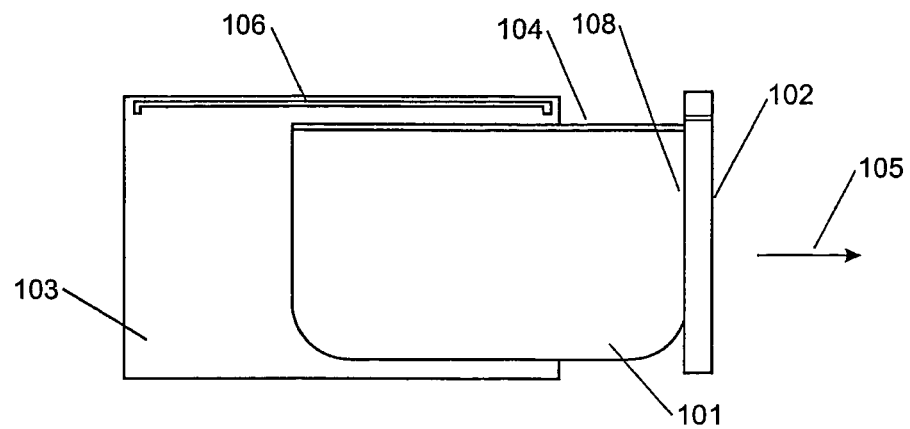
FIG. 1 is a diagrammatic longitudinal cross-section of a dishwasher of the preferred type to which the present invention relates.
Figure 2:
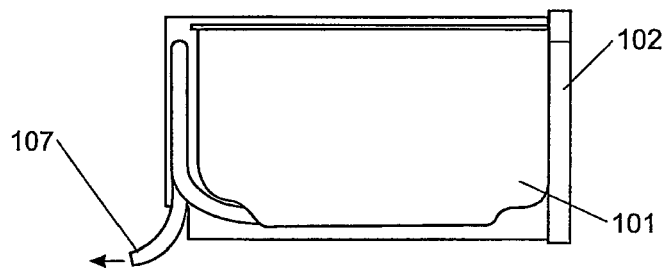
FIGS. 2 and 3 show in diagrammatic form the plumbing and wiring system employed in the dishwasher shown in FIG. 1.
Figure 3:
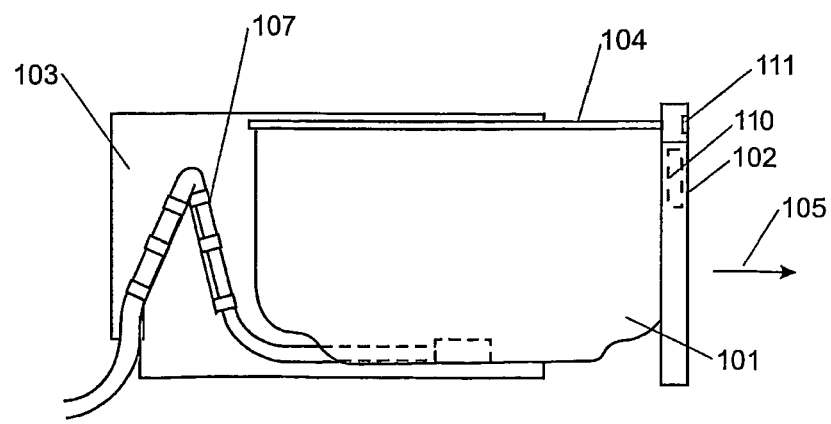

The present invention is particularly but not solely adapted for use in a dishwasher of a type illustrated in FIG. 1. A wash chamber 101 with all wash components fitted and a front panel 102 are slidably mounted within a cavity 103. The wash chamber 101 has an open top 104 and is drawn from the cavity 103 in the direction of arrow 105 to allow loading and unloading of dishes and is retracted into the cavity 103 during washing. The wash and drain systems are fitted within wash chamber 101, including a motor, pumps and water supply circuit. Flexible connecting wiring and plumbing 107 couple the wash chamber 101 to the relevant terminations within the cavity 103 this can be best seen in FIGS. 2 and 3. A lid 106 seals the chamber during washing of dishes. The water softener is located in a hollow wall 108 of the dishwasher.

The operation of the dishwashing machine is controlled by a programmed controller 110 of a known type.

Figure 4:
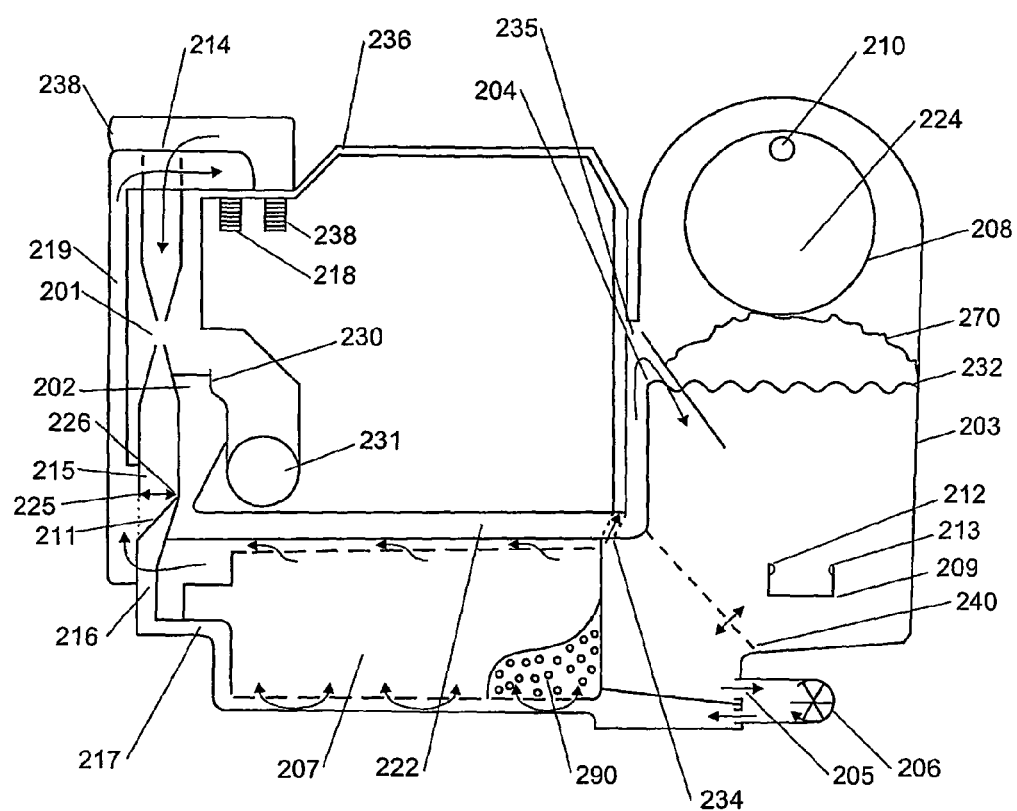
FIG. 4 is a schematic diagrammatically illustrating a first embodiment of the water softener of the present invention.

The present invention is a water softener particularly for use in a dishwasher. The water softener is located in the dishwasher water supply between the primary supply valve and the dishwasher chamber. Referring to FIG. 4 the softener includes a resin container 207 which contains an ion exchange resin. Water supplied to the dishwasher chamber 101 optionally passes through the resin container 207. Regenerating brine is developed in a brine container 203. The brine container 203 is supplied manually with solid salt and water diverted from the main supply at an air break 201. In the regenerating cycle brine is delivered from the brine container 203 to the resin container 207 by a pump 206. The operating cycle of pump 206 determines the degree of regeneration of the resin.

In the normal washing cycle water enters from a main flow control valve through inlet 238 and supply conduit 214. The supply conduit 214 leads to an air break 201. An air break 201 is commonly provided to prevent back flow. The flow passes through the air break 201 to a flow control valve 211. The flow control valve 211 is controlled by the appliance controller 110 and controls whether or not the water entering the wash chamber 101 is softened or bypasses the resin container 207 and therefore is not softened before entering the wash chamber 101.

Figure 10:
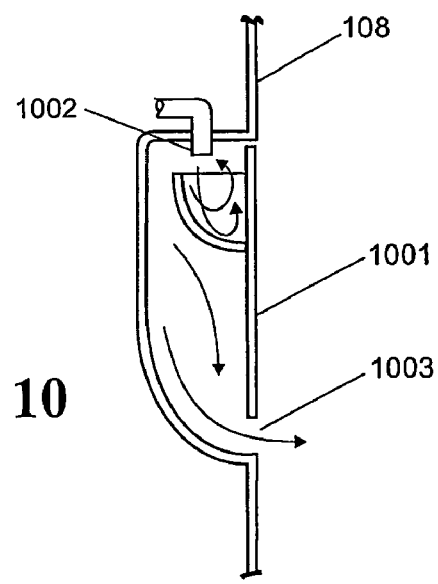
FIG. 10 shows the detergent dispenser of the present invention.

When the water is to be softened the flow control valve 211 is in position 225 and water flows via conduit 216 through the flow control valve 211 via conduit 217 to resin container 207. The water is softened by the resins 290 in the resin container 207 and enters the dish wash chamber 101 via conduit 219 and outlet 218. When water is not to be softened the flow control valve 211 is in position 226 and the water flows to the wash chamber 107 via conduit 219 and outlet 218. Water flowing to the wash chamber 107 may pass through a detergent dispenser 1001 shown in FIG. 10. The detergent dispenser inlet 1002 receives water from outlet 218 and supplies water to the wash chamber 101 via detergent dispenser outlet 1003. The detergent dispenser 1001 is preferably mounted in a hollow vertical wall 108 of the appliance.

The programmed controller 110 may also switch the flow control valve 211 during water supply to change the softness level of water supplied to the wash chamber 107. The flow control valve 211 may be switched to mix unsoftened water and softened water to achieve the desired softness level of water supplied to the wash chamber 107. Some cycles in the washing program do not require soft water, for example the initial rinse, and the controller 210 can switch the flow control valve 211 to achieve the desired water softness for each cycle. In the preferred embodiment the controller 110 controls the flow control valve 211 so as to determine the ratio of the water components of the blend to achieve a desired softness of water in the wash chamber 107.

The resin regeneration system using brine will now be described. Brine is produced in a brine container 203 by mixing water with salt.

To supply water to the brine container 203 an air break 201 in the water supply circuit has an outlet orifice 202 bleeding off a proportion of water passing there through. The leakage through orifice 202 flows via conduit 222 into the brine container 203. Water is supplied to the brine container 203 using this leakage from outlet 202. This has the advantage of the elimination of active parts to supply water to the brine container 203. Any excess fluid in the brine container 203 overflows weirs 204 and 230 and enters the wash chamber 101 via a air breather 231, or flows by a concealed conduit (now shown) to the dishwasher drain or sump. Excess leakage from the air break 201 is also channelled away via air breather 231 or flows by a concealed conduit (not shown) to the dishwasher drain or sump.

Figure 4A:
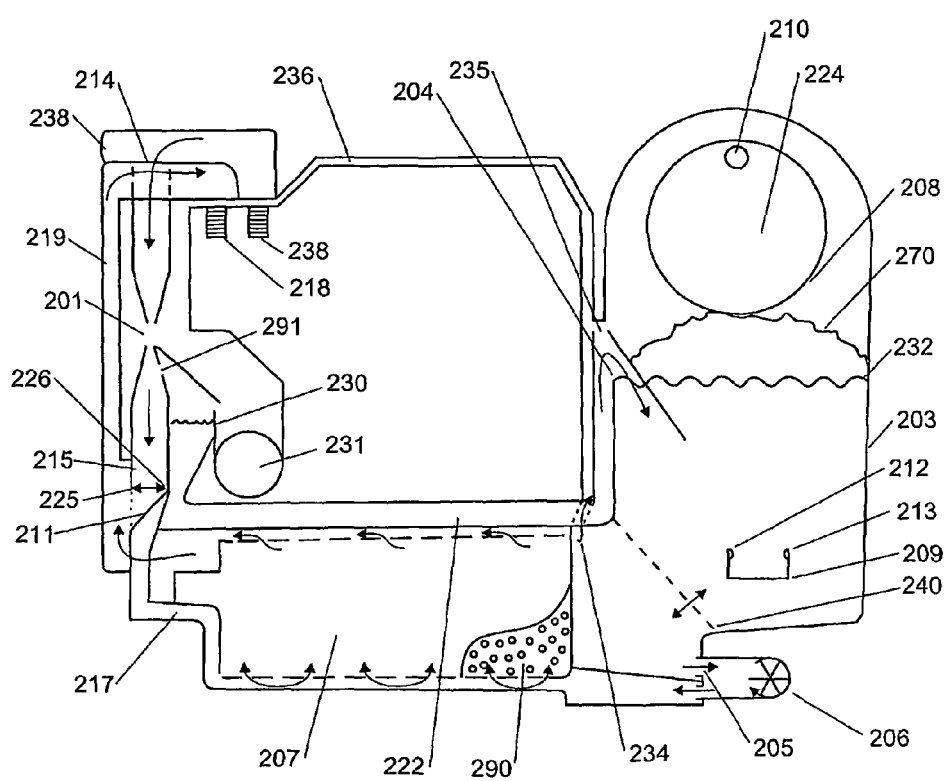
FIG. 4A is a schematic diagrammatically illustrating a second embodiment of the water softener of the present invention with a hole in the supply conduit supplying water to the brine tank.

In an alternative seen in FIG. 4A a small hole 291 in conduit 215 provides for the bleeding off of a small proportion of water. The hole 291 is preferable in a high velocity point (a reduced section) so the hole can be larger and therefore easier to manufacturer. Excess leakage from the hole 291 overflows weir 230 and is channelled away via air breather 231 or flows by concealed conduit (not shown) to the dishwasher drain or sump. In any of the alternatives described water can be supplied to the brine container 203 via the leakage from the air break 201, from a small hole in conduit 215 or using a combination of both.

Figure 6:
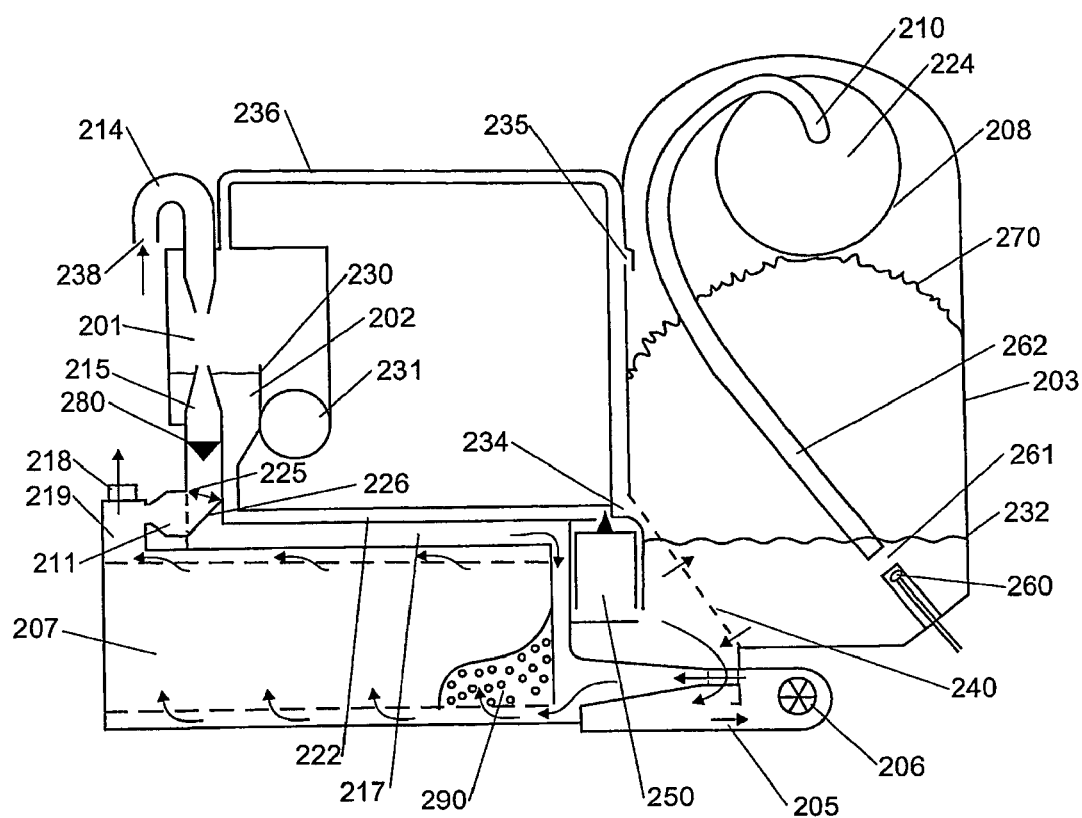
FIG. 6 is a schematic diagrammatically illustrating a fourth embodiment of the water softener of the present invention using an alternative float valve to control the water level in the brine tank.

Alternatively as seen in FIG. 6 a float valve 250 controls the fluid level in the brine container 203. Water supplied by conduit 222 is prevented from entering the brine container 203 by float valve 250 when water is at or above level 232. Excess leakage from the air break 201 overflows weir 230 and is channelled away via air breather 231 or flows by concealed conduit (not shown) to the dishwasher drain or sump.

Figure 5:
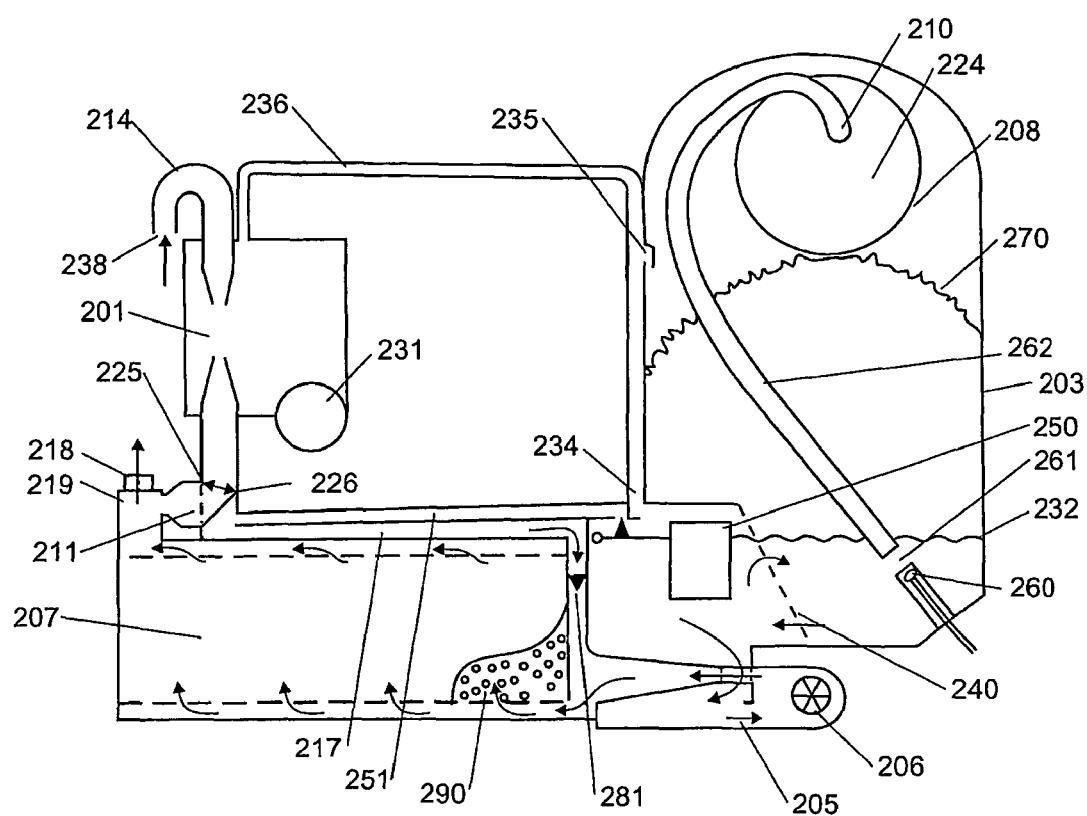
FIG. 5 is a schematic diagrammatically illustrating a third embodiment of the water softener of the present invention with a float valve to control water level in brine tank.

In a further alternative as seen in FIG. 5 water flows through the air break 201 via conduit 251 into the brine container 203. A float valve 250 prevents water flowing into the brine container 203 when the fluid level of the resin container is at or above level 232.

A salt filling orifice 208 is used to manually replenish the salt in the brine container 203. The salt filling orifice 208 is plugged with a cap or bung 224 when not opened for refilling. The fluid in the brine container 203 is at a level 232 below the filling orifice 208.

Figure 9:
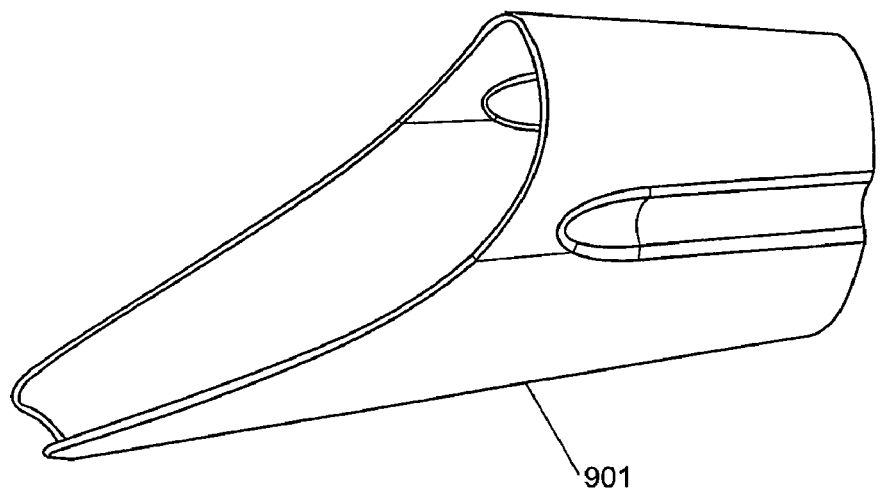
FIG. 9 shows the salt replenishment device of the preferred water softener of the present invention.

A suitable device 901 shown in FIG. 9 is used to replenish the salt. The device is shaped so that the salt granules flow freely into the brine container 203. The shape is also necessary because the salt filling orifice 208 of the brine container 203 is in a hollow vertical wall 108 of an appliance.

As the brine container 203 is filled with salt, the level of water in the brine container is maintained by having the excess fluid overflow the weirs 204 and 230. This has the advantage that the device 901 used to refill the salt does not get wet nor is salt washed away and wasted. Any fluid overflowing the weirs 204 and 230 comes from the top of the brine container 203, and will have a lower content of dissolved salt.

Alternatively as seen in FIGS. 5 and 6 the fluid level in the brine container 203 rises when salt is added but because of the use of the float valve 250 no fluid is added until the level is below the float valve level. Because the fluid level 232 is below the salt level 270 when salt is added the fluid level will rise but not sufficiently to overflow.

Air vents 234, 235 allow for the removal of air by conduit 236.

Figure 8:
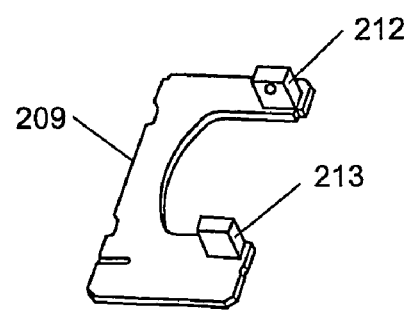
FIG. 8 shows the salt detector of the preferred water softener of the present invention.

The presence of solid salt in the brine container 203 is sensed using a salt sensor 209. The sensor 207 can be seen in FIG. 8. The salt sensor 209 includes a light 212 and light sensor such as a photo transistor 213 positioned at the bottom of the brine container 203. The presence of solid salt can be detected because solid salt deflects light reducing the intensity of light received at light sensor 213 from light 212, to an extent that the presence of solid salt can be differentiated from the absence of solid salt. The light sensor 213 output signal is supplied to an analogue input part of controller 110.

A salt empty indicator 210 provides a salt empty indication to a user. A light emitting diode can be used as the indicator. It is energised by the programmed controller. Timing when the salt empty indicator 210 is switched on can be altered relative to when the salt sensor 209 first detects an absence of solid salt. This delay can take into account the presence of dissolved salt in the brine container 203. Alternatively the salt empty indicator can be switched on directly by a salt sensor control circuit not shown.

Figure 7:
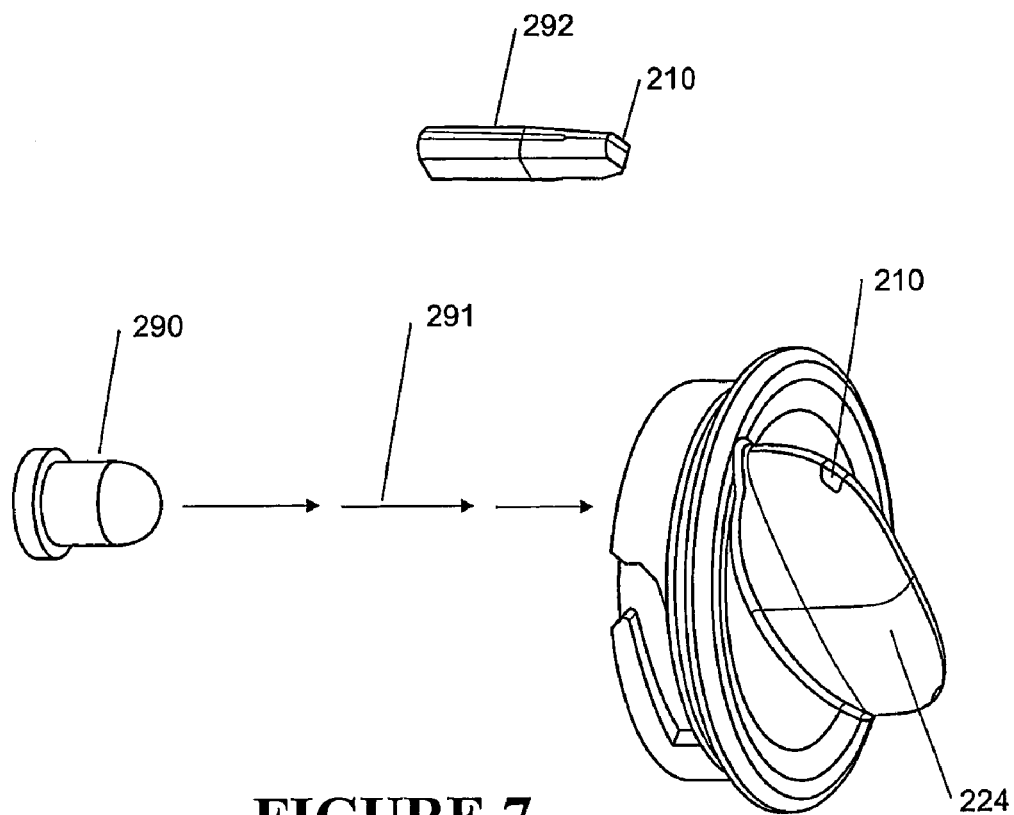
FIG. 7 shows the light and light pipe for indicating the need to replenish salt.

The salt indicator 210 is in the bung 224 of the brine container 203. In the preferred embodiments seen in FIG. 7 a light 290 shining in direction of arrows 291 shines through light pipe 292 and as seen by a user as indicator 210.

In a further alternative seen in FIGS. 5 and 6 the salt sensor 209 is replaced with a light 260 and a light pipe 262 the light shining through the light pipe 262 only when solid salt is absent. When solid salt is present light is deflected and does not shine through the light pipe. A gap 261 exists between light 260 and light pipe 262 and when solid salt is present the salt deflects the light.

An outlet 205 in the brine container 203 feeds brine to pump 206 via a conduit 221. The brine flowing out of the brine container 203 is pumped through resin container 207 replenishing the resins 290 which are used to reduce the hardness of the water. Mesh 240 prevents solid salt from being pumped through the resin container 207. Excess fluid pumped through the resin container 207 is drained away via conduit 219 and outlet 218 to the dishwasher drains. The pump 206 is directly controlled by the programmable controller 110 and the quantity of fluid delivered to the resin container 207 is controlled by controlling the duty cycle of the pump. The pumping cycle can be adjusted via a keypad 111 attached to the controller 110.

The amount of brine that is pumped through the resins 290 affects the overall replenishment of the resins 290. How replenished the resins 290 are, affects the ability of the resins 290 to soften the water. The more replenished the resins 290 are the greater the difference between the water entering the resin container 207 via conduit 217 and the water leaving the resin container 207 via conduit 219 and outlet 218 will be. A desired water softness level can be achieved by adjusting the amount of brine replenishing the resins 290 and this can be adjusted by altering the duty cycle of the brine pump 206.

In a resin 290 replenishment cycle, flow control valve 211 is in position 226 and the brine is pumped by the brine pump 206 from the brine container 203 into resin container 207. Water leaving the resin container 207 as the brine is pumped in will pass through conduit 219 and outlet 219 into the dishwasher chamber 101 and be drained away.

In an alternative embodiment the flow control valve 211 would be in position 225 and a percentage of water leaving the resin container 207 would pass via conduit 215 leakage 202 and conduit 222 into the salt container 203. A percentage would still pass into the wash chamber 101 and be drained away. This has the advantage of reducing water usage.

Using the brine pump 206 the regeneration of the resins 290 in the resin container 207 can happen even when the resin container 207 is softening water for supply to the wash chamber 101.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

The invention claimed is:

1. A washing appliance connected to a water supply which supplies raw water to said washing appliance, said washing appliance comprising:
   a wash chamber adapted to accommodate items to be washed during a wash cycle;
   a programmed controller;
   a water softener comprising
   a resin container connected to the water supply and to said wash chamber,
   resins within said resin container, said resins suitable for softening raw water received from the water supply, said resin container in use receiving raw water from the water supply and supplying softened water to said wash chamber,
   a brine container connected to the water supply and to said resin container, said brine container having a salt inlet for the introduction of salt into said brine container, a water inlet for the supply of raw water from the water supply into said brine container, and an outlet for supplying brine from said brine container to said resin container; and
   a flow directing arrangement providing a first connection between the water supply and said resin container when said flow directing arrangement is in a first configuration and providing a second connection between the water supply and said wash chamber when said flow directing arrangement is in a second configuration, wherein raw water from the water supply is supplied directly to said resin container when said flow directing arrangement is in said first configuration, and wherein raw water from the water supply is supplied directly to said wash chamber when said flow directing arrangement is in said second configuration, said flow directing arrangement in use being controlled by said controller to provide raw water from the water supply to said resin container or to said wash chamber so as to provide a blend of raw water and softened water to said wash chamber.

2. A washing appliance as claimed in claim 1 wherein said flow directing arrangement is a two-way solenoid.

3. A washing appliance as claimed in claim 1 further including a detergent dispenser wherein softened water supplied to said wash chamber by said water softener passes through said detergent dispenser.

4. A washing appliance as claimed in claim 1 wherein said water softener is mounted in a hollow wall of said washing appliance.

5. A washing appliance as claimed in claim 1 wherein said brine container includes an overflow weir for maintenance of a maximum water level in said brine container.

6. A washing appliance as claimed in claim 5 wherein spillage from said overflow weir is coupled directly to an appliance drain.

7. A washing appliance as claimed in claim 5 wherein spillage from said overflow weir is coupled directly to an appliance sump.

8. A washing appliance as claimed in claim 5 wherein said maximum water level in said brine container is controlled by a float valve.

9. A washing appliance as claimed in claim 1 wherein said wash appliance in use is accommodated within a cavity in kitchen joinery or a free-standing cabinet, and additionally comprises:
   a wash system slidably mounted within said washing appliance in a manner that it may be withdrawn horizontally for access thereto, said wash system including:
   said wash chamber, said wash chamber is open topped; and
   a wash chamber closure that covers the open top of said open top chamber on retraction of said wash chamber into said washing appliance.

10. A washing appliance as claimed in claim 1 wherein said washing appliance is a dishwasher.

11. A washing appliance as claimed in claim 1 wherein a pump is connected to the brine container outlet and the resin container, the pump being controlled by the controller to pump brine through the resin container to regenerate the resins.

12. A washing appliance as claimed in claim 11 wherein the regeneration of said resins being controlled by said controller in accordance with the supply water hardness, and the controller controls a duty cycle of said pump to control the introduction of brine into said resin container.

* * * * *